Patented May 26, 1942

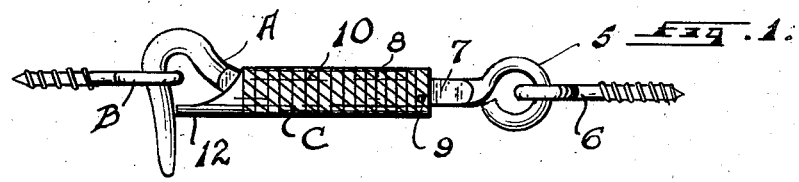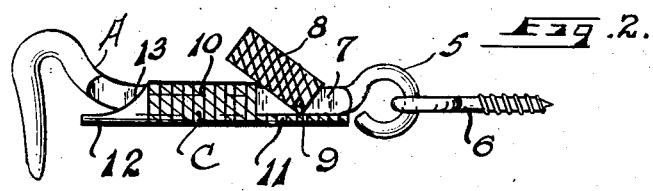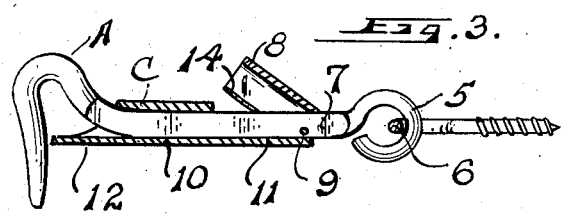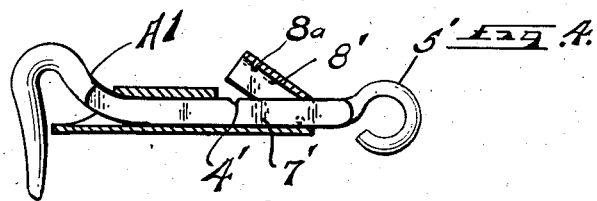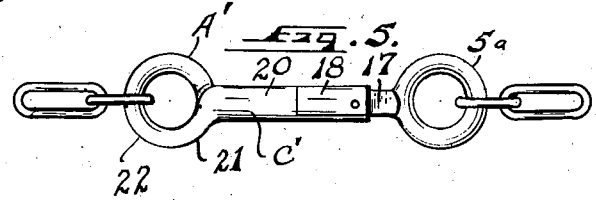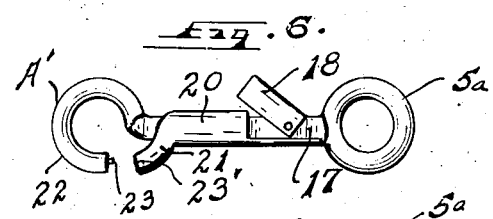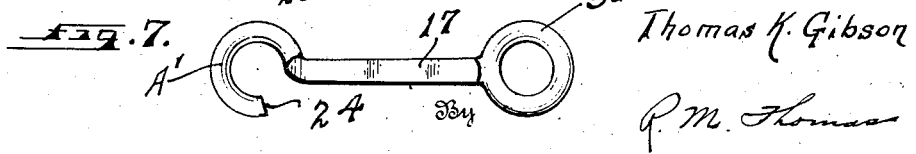

2,283,983

UNITED STATES PATENT OFFICE 2,283,983

HOOK FASTENER

Thomas K. Gibson, Salt Lake City, Utah

Application August 9, 1941, Serial No. 406,212

5 Claims. (Cl. 292—106)

My invention relates to hooks and more particularly to screen door hooks and has for its object to provide a new and highly efficient locking type of hook which cannot be opened except by manual manipulation.

A further object is to provide a latch hook of the hook and eye type in which the hook is provided with a sliding lock member held in fixed closed position by a pivotally mounted locking member.

A still further object is to provide a hook in which a sliding lock bar is when desired held in fixed closed position by a pivoted locking member and which member may be manually elevated when desired to permit releasing the bar so that the hook may be unlatched.

A still further object is to provide a hook device adapted for use in linking anything together such as chains, either large type or small necklace chains, and which will lock the hook into engagement to prevent the loss of the valuable necklace or lavalier.

These objects I accomplish with the device illustrated in the accompanying drawing in which similar numerals and letters of reference indicate like parts throughout the several views and as described in the specification forming a part of this application and pointed out in the appended claims.

In the drawing

Figure 1 is a side elevation of the hook with the locking bar in place locking the hook onto the eye bolt.

Figure 2 is a side elevation of the hook showing the locking bar released with the locking member pivoted to the opening position.

Figure 3 is a vertical longitudinal section of the locking bar and locking member the hook being shown in elevation.

Figure 4 is a view similar to Figure 3 in which the locking member is provided with a locking lug and the pivots are indentations instead of a pivot pin.

Figure 5 is a side elevation of a modified type of hook for engaging the two ends of a chain together, either small or large type.

Figure 6 is a view showing the disengagement of the locking means.

Figure 7 is a view of the hook with the lock bar and member removed.

In the drawing in which I have shown my invention the hook is shown as A, having an eye 5 in the end thereof by which the hook is engaged in a screw eye 6 for securing the end of the hook to the door frame. A screw eye B is provided through which the hook is engaged for locking the door or wherever used in the locked position. The body 7 of the hook A is made flat on each side and carries a sliding lock bar C thereon. The lock bar C is provided with a body 10 which completely encircles the body 7 of the hook with the inside faces made flat to slide along the flat sides of the hook body. The locking member 8 is made U-shaped in cross section and pivotally mounted to the body 7 by the pivot 9 being passed through the body and both sides of the U-shaped body. The sliding bar or locking bar C has one end extended in a base 11 along the bottom of the hook and the beveled edges on the inner surface of the member 8 fit along the sides of the base member 11 forming a fit so smooth that a glance cannot determine whether there is a joint therebetween.

To further camouflage the juncture between the sliding and the locking members, vertical and angled recesses or lines are formed on the outer perimeter of both the member 8 and body 10 so that it is hard to detect the juncture between these parts.

The locking bar has the end adjacent the hook extended in a locking lug 12 with the top cut away at 13 to form a curved portion giving the hook a neat appearance and providing the extended locking bar 12 thereunder.

The operation of the device is as follows:

The locking member 8 is grasped between the fingers and elevated into the position shown in Figure 2 at which time the locking bar C and lug 12 may be moved longitudinally on the body 7 to open the way for disengagement of the hook from the eye. To lock the hook, the hook is first inserted through the screw eye B and body C moved to engage the lug 12 under the eye and the locking member 8 pressed down into the space behind the body 10 engaging along the sides of the base 11.

In Figure 4 I have shown a slightly modified type of locking member with the hook shown as A1, the locking member as 8' and being provided with a lug 8a depending on the inside surface of the U-shaped area thereof and a like formed recess 4' is formed in the top side of the body 7' into which the lug 8a fits when the locking member 8' is pressed down into locked position. The pivotal axis for this type of member 8' is merely depressions in the side of the body 7' and indentations on the inside of the member 8' to fit into said recesses. The locking lug is to prevent excessive pressure from forcing the members along the body 7' when in locked position.

In Figures 5 to 7 inclusive I have shown a slightly modified type of hook adapted to be used to engage and lock the two ends of a neck chain, or even large log chain together to prevent their coming apart accidentally. This type of hook is shown as A8 having the eye shown as 5a and the hook portion shown as a larger part of a circle hook 22. The locking bar 20 is made similar to that of the body 10 except that the locking bar is formed as a continuation of the circle as 21 and the bar 20 operates on the flattened body 17 of the hook A8. The locking member 18 is made identical in form to the same member in the other views. The end of the locking bar 21 is formed with a recess 23' therein which engages over an extended lug 23. The body 24 of the bar 20 is provided with the base 26 to slide back along the bottom of the body 17. The ends of the hook may be beveled as at 28 and at the end of the bar beveled as at 25 to make a flush meeting instead of having the interlocking effect of the recess 23' and lug 23. This is the preferred type for use on large log chains, trailer hook chains and the like, making it easy to lock or disengage the end link of the chain when the locking member has been released and the lock bar drawn back.

Having thus described my invention I desire to secure by Letters Patent and claim:

1. A hook fastener of the class described comprising a body having a hook formed on one end thereof; means slidably mounted on said body to close the opening of said hook; locking means pivotally mounted to said body, said slidable means and locking means having portions adapted to abut each other to lock the slidable means in the closed position, the outer surfaces of both means being formed with lines and with one of said lines coinciding with the juncture of said abutting portions.

2. A hook fastener of the class described comprising a body portion having a hook on one end thereof, a locking bar slidably mounted on said body to close the open side of said hook, said bar comprising a front portion and a rearwardly extended portion, a locking member pivotally attached to the body and adapted to abut the rear end part of the front portion and also the rearwardly extended portion of the locking bar when the locking bar is in closed position.

3. A hook fastener of the class described comprising a body portion having an eye in one end and a hook formed on the other end thereof, a locking bar slidably mounted on said body to close the open side of said hook, said bar encircling the body for a portion of its length and having a rearwardly extended portion, a locking member pivotally attached to the body and adapted to abut the rear end part of the encircling portion and the rearwardly extended portion of the locking bar when the locking bar is in closed position, and recesses formed on the outer surfaces of the locking bar and the locking member so as to camouflage the abutting edges of the said locking bar and locking member.

4. A hook fastener of the class described comprising a body portion having an eye in one end and a hook formed on the other end thereof, a locking bar slidably mounted on said body with the bar encircling the body for a portion of its length and having a rearwardly extended portion, a substantially U-shaped locking member pivotally attached to the body and adapted to abut rear end part of the encircling portion and the rearwardly extended portion of the locking bar when said locking bar is in closed position.

5. A hook fastener of the class described comprising a body portion having a hook formed on one end thereof, a locking bar slidably mounted on said body with the bar encircling the body for a portion of its length and having a rearwardly extended portion, a substantially U-shaped locking member pivotally attached to the body and adapted to abut the rear end part of the encircling portion and the rearwardly extended portion of the locking bar when said locking bar is in closed position, and recesses formed on the outer surfaces of the locking bar and the locking member so as to camouflage the abutting edges of the said locking bar and the said locking member.

THOMAS K. GIBSON.